(12) United States Patent  (10) Patent No.: US 7,555,380 B2
Maue et al.  (45) Date of Patent: Jun. 30, 2009

(54) NON-CONTACT SEAT POSITION SYSTEM

(75) Inventors: H. Winston Maue, Farmington Hills, MI (US); Scott Robert Gauss, Shelby Township, MI (US); Naoko Kawahara, Yawata (JP); Craig Gerald Goodman, Lansing, MI (US); Daryl Gerard Petricca, Rochester Hills, MI (US); Jonathan Lloyd Wenc, Hancock, MI (US); Daniel Drew, Glenview, IL (US); Jeremy R. Geiger, Harbor Beach, MI (US); Michael Paul Thielen, Baroda, MI (US); Lukman Efendy, West Sumatra (ID); Keith Parrott, Otter Lake, MI (US)

(73) Assignee: Lear Corporation, Southfield, MI (US)

( * ) Notice: Subject to any disclaimer, the term of this patent is extended or adjusted under 35 U.S.C. 154(b) by 636 days.

(21) Appl. No.: 10/907,804

(22) Filed: Apr. 15, 2005

(65) Prior Publication Data

US 2006/0231319 A1   Oct. 19, 2006

(51) Int. Cl.
*B60R 21/16* (2006.01)
(52) U.S. Cl. .................... 701/49; 180/271; 280/735; 356/4.01
(58) Field of Classification Search ............. 180/271; 280/735; 307/10.1; 356/4.01, 614; 701/49
See application file for complete search history.

(56) References Cited

U.S. PATENT DOCUMENTS

| 5,967,549 | A | * | 10/1999 | Allen et al. | 280/735 |
| RE37,466 | E | * | 12/2001 | Allen et al. | 280/735 |
| 6,351,994 | B1 | * | 3/2002 | Pinkos et al. | 73/432.1 |
| 6,561,544 | B1 | * | 5/2003 | Clancy et al. | 280/735 |
| 6,921,107 | B2 | * | 7/2005 | Mills et al. | 280/735 |
| 7,195,261 | B2 | * | 3/2007 | Yoshida et al. | 280/735 |
| 2006/0032979 | A1 | * | 2/2006 | Mitchell et al. | 244/118.6 |
| 2006/0282204 | A1 | * | 12/2006 | Breed | 701/49 |

FOREIGN PATENT DOCUMENTS

| GB | 2417084 | 2/2006 |
| JP | 59023740 | 2/1984 |

\* cited by examiner

*Primary Examiner*—Mark Hellner

(57) ABSTRACT

A non-contact seat position system is provided. The system includes a lower seat track, an upper seat track, a target and a sensor. The upper seat track is positionably connected to the lower seat track, whereby the upper seat track may be positioned into a desirable location. The target is connected either to the lower seat track or the upper seat track, and the sensor is connected to the other of the lower seat track and the upper seat track. The sensor has a line of sight with the target, wherein the sensor when powered, outputs a sensor signal determined from a reflected signal coming from the target. In a first embodiment of the system, the sensor is an infrared sensor. In a second embodiment of the system the sensor is an optical sensor. A method of non-contact seat position system determination is also provided.

30 Claims, 3 Drawing Sheets

US 7,555,380 B2

NON-CONTACT SEAT POSITION SYSTEM

TECHNICAL FIELD

The present invention relates generally to an automotive seat position sensing system and more particularly to a system for non-contact seat position determination and method thereof.

BACKGROUND OF THE INVENTION

Automotive seat assemblies play an important role in automobile design and functionality. It is desirable to know the position of the seat assembly.

Accordingly, it would be desirable to have a system that may determine seat position in order that other systems may use the information, such as memory seat position systems.

Also, it would be desirable to have a system to determine seat position over the first portion of seat travel to condition or reduce airbag force deployment. It would also be desirable to have a system capable of accurately measuring the total displacement of the seat track. Moreover, it would be desirable to also have a system that may be used for memory seat applications. The capability of accurately measuring the total displacement of the track and using the seat displacement would have desirable advantages for other uses. Further, it would be desirable to have a system that could directly output seat position without calibration, position error, or position validity problems.

SUMMARY OF THE INVENTION

A non-contact seat position system is provided. The system includes a lower seat track, an upper seat track, a target and a sensor. The upper seat track is positionably connected to the lower seat track, whereby the upper seat track may be positioned into a desirable location. The target is connected either to the lower seat track or the upper seat track, and the sensor is connected to the other of the lower seat track and the upper seat track. The sensor has a line of sight with the target, wherein the sensor, when powered, outputs a sensor signal determined from a reflected signal coming from the target.

In a first embodiment of the system, the sensor is an infrared sensor. In a second embodiment of the system the sensor is an optical sensor. A method of non-contact seat position system determination is also provided.

The system of the present application may be used for the first portion of seat travel to condition or reduce airbag force deployment, but since the system is also capable of measuring the total displacement of the track the system may be used for memory seat application. The capability of accurately measuring the total displacement of the track and using the seat displacement has other advantages. Another advantage of the system is that seat position may be determined from the sensor output. Yet another advantage of the non-contact position sensor system is that the error variance is reduced as compared to other forms of contact type sensors that have movable and wearable parts.

Other aspects and advantages of the present invention will become apparent upon the following detailed description and appended claims, and upon reference to the accompanying drawings.

DESCRIPTION OF THE PREFERRED EMBODIMENT(S)

Throughout the figures and in the views, common elements are labeled with the same reference number. The common element may also include an additional number indicating that it is a particular type, kind or style of element for the embodiment presented. The reference numbers indicating a particular type, kind or style of element are not intended to be limiting, and are intended to help the reader in understanding the different embodiments presented in this invention.

Figure 1:
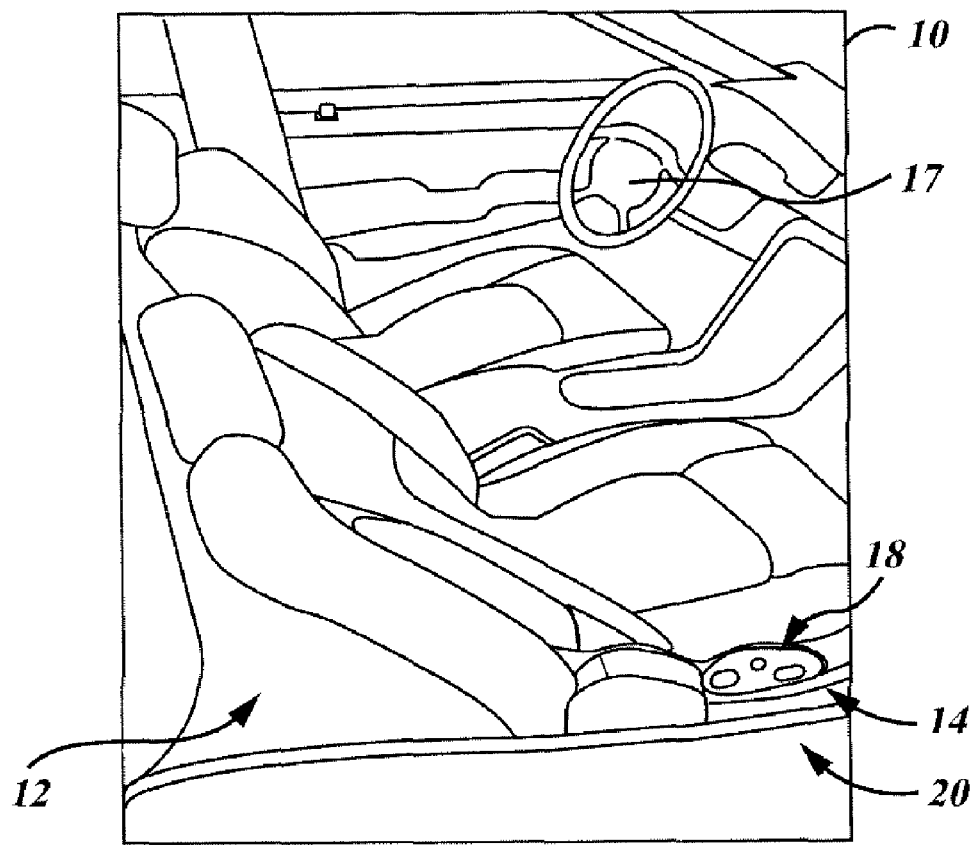
FIG. 1 is a perspective view of a front seat assembly mounted in a vehicle using a non-contact seat position system of the present invention to advantage.

In accordance with the present invention, FIG. 1 shows a perspective view of a front seat assembly 12 mounted in a vehicle 10 using a non-contact seat position system 20 being used to advantage. The novel non-contact seat position system 20 may be used to supply a seat displacement distance or travel distance to other vehicle systems, such as to vary the sensitivity factors used in deploying an airbag 17 or for an automatic seat adjustment system 18. The non-contact seat position system includes the seat track assembly 14 commonly part of a seat assembly 12.

Figure 2:
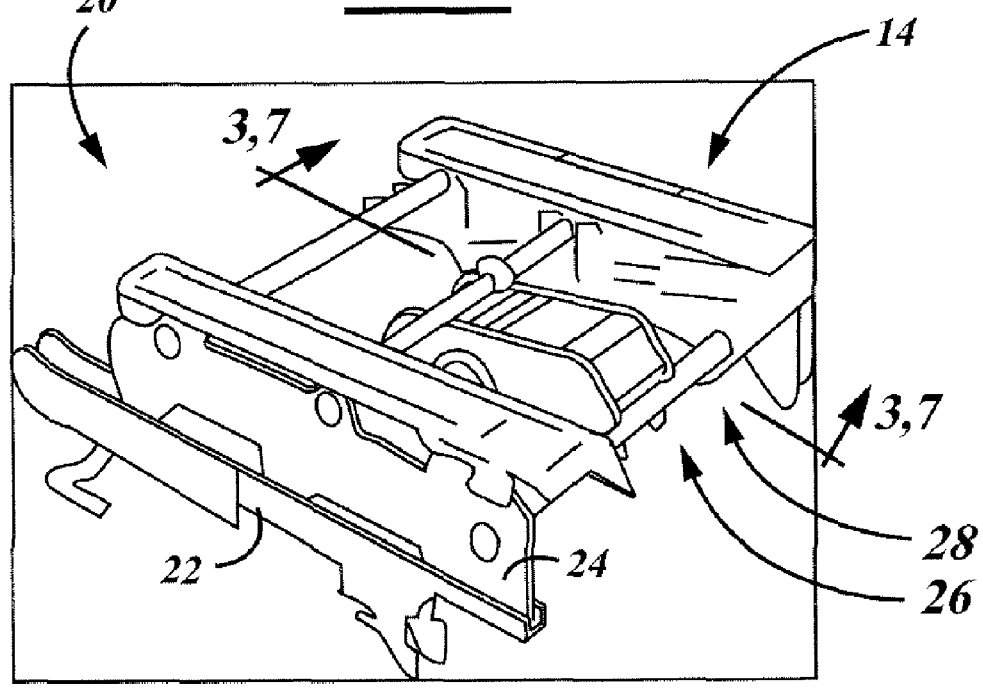
FIG. 2 is a perspective view of a seat track assembly using the non-contact seat position system of the present invention to advantage.
Figure 3:
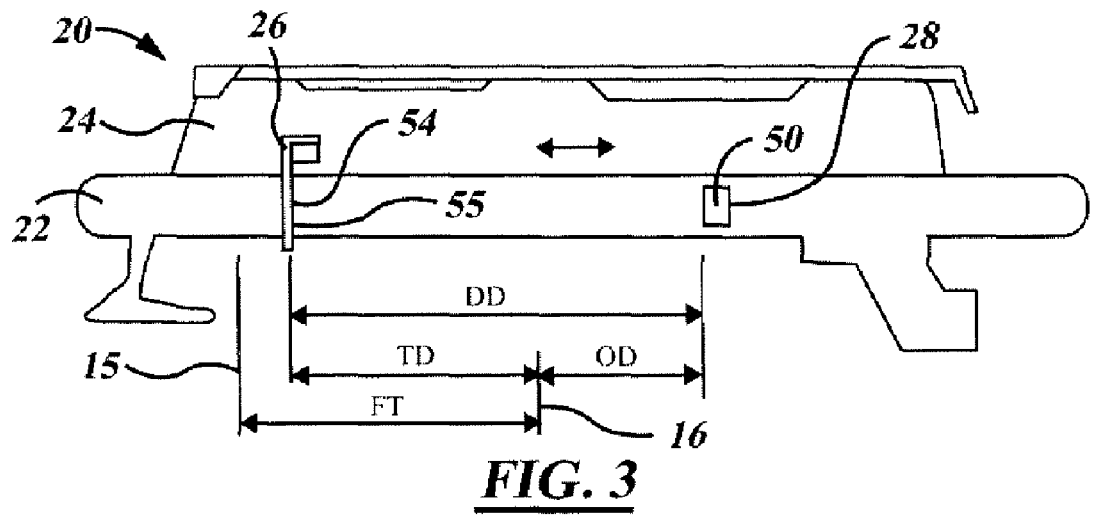
FIG. 3 is an illustrative view of a first embodiment of the non-contact seat position system being used to advantage.
Figure 7:
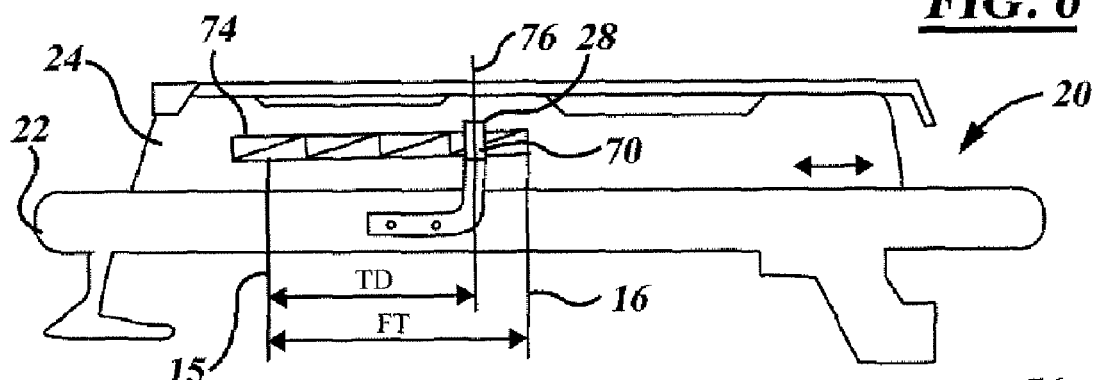
FIG. 7 is an illustrative view of a second embodiment of the non-contact seat position system being used to advantage.

FIG. 2 shows a perspective view of a seat track assembly 14 using the non-contact seat position system 20 of the present invention to advantage. The seat track assembly 14 includes a lower seat track 22 and an upper seat track 24. The lower seat track 22 may be selectively attached to a vehicle 10. The upper seat track 24 is positionably connected to the lower seat track 22, wherein the upper seat track 24 may be positioned nominally in the fore or aft directions of the vehicle. The upper seat track 24 typically is limited in either direction by a first seat stop (not shown) and a second seat stop (not shown). In FIGS. 3 and 7, a lead line represents the first seat stop 15 and the second seat stop 16 indicating the fixed travel distance FT between the fore and aft directions of the upper seat track 24.

Figure 6:
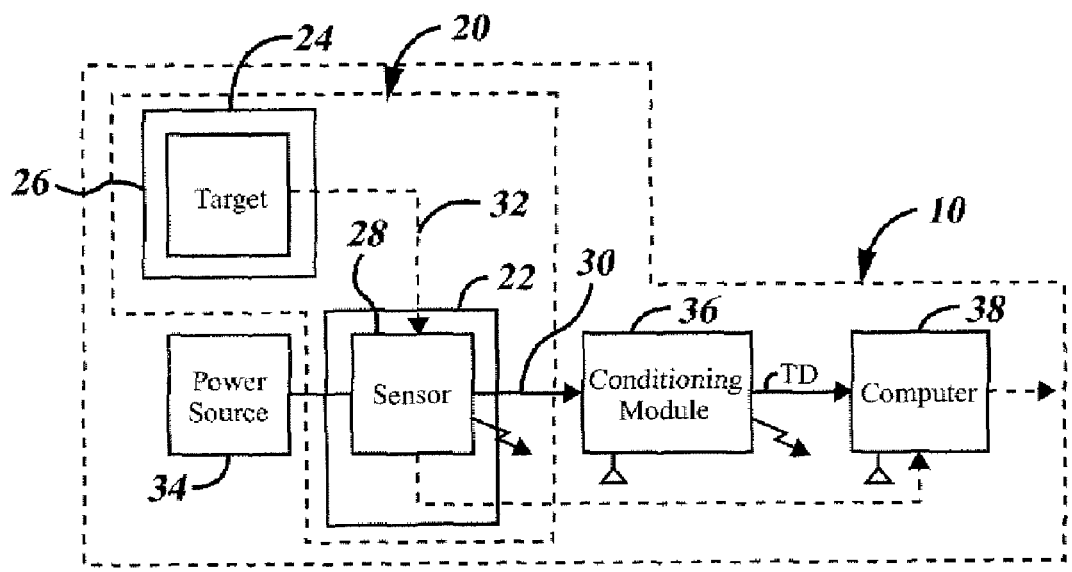
FIG. 6 is a block diagram of the non-contact seat position system of the present invention being used to advantage.

The non-contact seat position system 20 shown in FIG. 2 is also shown in FIG. 6. FIG. 6 is a block diagram of the non-contact seat position system 20 of the present invention being used to advantage. The non-contact seat position system 20 includes a target 26 and a sensor 28. The target 26 is connected to the upper seat track 24 and the sensor 28 is connected to the lower seat track 22. A person of skill in the art will recognize that the target and the sensor need to be connected to the tracks thereby leaving a line of sight open between the sensing element on the sensor and the target.

Optionally, the target could be connected to any other part of the upper seat track or even to the lower seat track, with the sensor connected to any other part of the lower seat track or to the upper seat track. Primarily, the sensor and the target need be mounted to two parts that have a positionable relationship to each other. The selection for the sensor to be mounted to the lower seat track is only out of convenience, thereby allowing other vehicle components and circuitry to be connected to the sensor connected to the more stationary part, i.e. the lower seat track. Also, the target and sensor could be connected within a housing assembly, one portion of the housing assembly being connected to one of the tracks and the other portion of the housing assembly being connected to the other of the tracks.

The sensor 28 when powered may output a sensor signal 30. The sensor signal 30 generated by the sensor 28 is in response to a reflected signal 32 received from the target 26. The sensor signal 30 may be used to advantage by transmitting the signal to other devices by physical or wireless communication.

The vehicle 10 includes a power source 34. Optionally, the sensor and the system may have their own power source. However, it is intended that the power source 34 used by the vehicle 10 will supply the necessary power for the non-contact seat position system 20 or sensor 28 to function properly.

The vehicle 10 includes a conditioning module 36. The conditioning module 36 receives the sensor signal 30 and outputs a seat travel distance TD representative of said sensor signal 30 received. Optionally, the non-contact seat position system 20 or the sensor 28 may include the conditioning module.

The vehicle 10 includes a computer 38. The computer 38 may receive the sensor signal or the seat travel distance TD representative of the sensor signal received. The computer 38 may use the signal received for any purpose. Optionally, the non-contact seat position system 20 or the sensor 28 may include the computer.

The present invention is directed to the distance determination using non-contact sensors in a novel way for determining the seat position or seat travel distance. A person of skill in the art will recognize that the conditioning module or the computer may coincide with the sensor. Also, a person of skill in the art will recognize that the reflected signal 32 received by the sensor may be characterized in a myriad of ways and the sensor's output signal is relative to a characterization or a functionality relationship based upon the input of the reflected signal. Moreover, a person of skill in the art will recognize that the signal may be processed in a number of ways having either a digital form or an analog form of output. A person of skill in the art will recognize the wiring requirements, the characterization requirement and I/O functionality requirements in order to convert the reflected signal into a usable form. What is not obvious to a person of skill in the art is the novel system for non-contact seat position system presented herein.

Optionally, the sensor 28 may provide a source for the signal that is reflected back to the sensor.

Returning to FIG. 2, a first embodiment of the invention is given in FIG. 3 and a second embodiment of the invention is given in FIG. 7 as called out.

Figure 5:
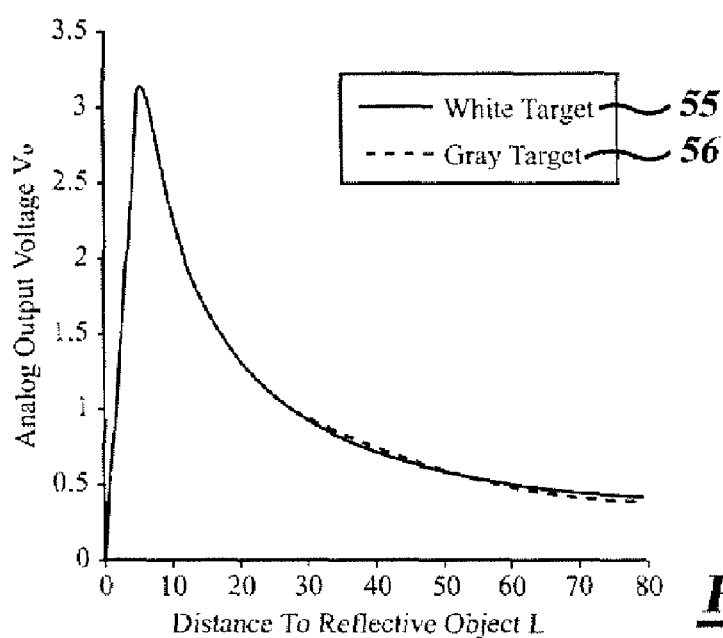
FIG. 5 is a graph representing the input output relationship of a sensor being used to advantage in the first embodiment of the non-contact seat position system.

FIG. 3 shows an illustrative view of a first embodiment of the non-contact seat position system 20 being used to advantage. The sensor 28 in this embodiment is an infrared "IR" sensor 50. The IR sensor being connected to the lower seat track 22. The target 26 being connected to the upper seat track 22, wherein the target 26 has a line of sight with the IR sensor throughout the upper seat track's travel. The target 26 has a target surface 54, and the target surface 54 is a white target 55. The target surface may be formed upon any suitable surface, but in this embodiment the target surface is made upon the target 26. Alternatively, a gray target may be utilized, however the gray target has lower reflective properties making it less suitable for use with the IR sensor as shown in FIG. 5.

The non-contact seat position system 20 receives the reflected signal 32 in the IR sensor 50 which may output a sensor displacement distance signal 52. The sensor displacement distance signal is determinative of a seat displacement distance DD. The seat displacement distance is the distance between the sensor and the current target position. The seat displacement distance DD is measured by the IR sensor when the sensor is powered.

The lower seat track 22 and the upper seat track 24 have a first seat stop 15 and a second seat stop 16. The fixed travel distance FT is the total length that the upper seat track 24 may travel upon the lower seat track 22 between stops 15, 16. The fixed travel distance FT is determined by the physical arrangement of the tracks, but may be determined by a calibration routine using the system and then storing the value or by manually inputting the distance into a lookup table stored in the computer or system.

In order to take advantage of the IR sensor 50 while minimizing error or false readings, the IR sensor 50 may have to be connected to the upper seat track 24 with an offset. The offset is represented by an offset target distance OD, which is the distance from the seat stop 16 in the other direction from seat stop 15. Conveniently, the IR sensor could be mounted in the opposite direction, but having an offset target distance from seat stop 15. The offset target distance OD may be determined by a calibration routine using the system and then storing the value or by manually inputting the distance into a lookup table stored in the computer or system.

The upper seat track 24 may reversibly travel a seat travel distance TD along the lower seat track 22. The seat travel distance TD is determined by subtracting the offset target distance from the seat displacement distance DD. It should be recognized that when the upper seat track 24 is at the first seat stop 15 the seat displacement distance DD would equal the sum of the offset target distance OD and the fixed travel distance. Also, it should be recognized that when the upper seat track 24 is at the second seat stop 16 the seat displacement distance DD would equal the offset target distance OD. A schematic representation of the target 26 travel is shown in FIG. 4.

Figure 4:
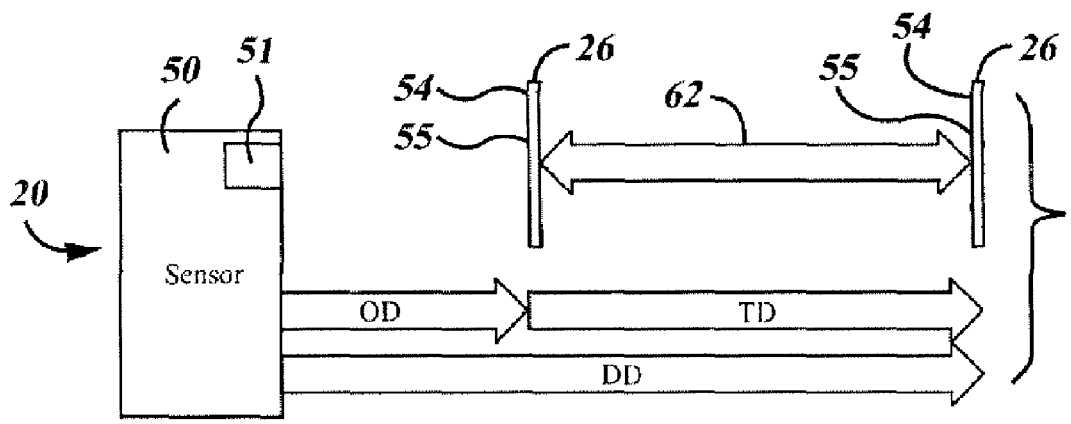
FIG. 4 is a schematic representation of position determination using the first embodiment of the non-contact seat position system.

FIG. 4 shows a schematic representation of position determination using the first embodiment of the non-contact seat position system 20. The arrow 62 represents the range over which the target may travel. Also shown in FIG. 4 is an infrared detection element 51 in the IR sensor 50 used to receive the reflected signal from the target 26.

In the present embodiment, the IR sensor 50 is a Sharp infrared detection sensor model GP2YOA21YK. The IR sensor has a characteristic input/output curve as shown in FIG. 5. Using the IR sensor to advantage in the present embodiment, the offset target distance OD is 10 centimeters, the fixed travel distance is 22 centimeters, and said seat displacement distance DD ranges between nearly 10 centimeters and 32 centimeters, thereby allowing the seat travel distance TD to optimally range between zero and 22 centimeters for this sensor. Optionally, the parameters mentioned are adjustable over any range to suit a particular application or sensor model. Optionally, a look up table or equation may be generated to linearize the output characteristic of the GP2YOA21YK device to make its output signal more usable. Optionally, the packaging of the system should be such that obstructions are minimized in the path from the sensor to the target on the moving portion of the seat track.

FIG. 5 shows a graph representing the input/output relationship of a IR sensor 50 being used to advantage in the first embodiment of the non-contact seat position system 20. The Sharp sensor has the relationship shown in FIG. 5, outputting a voltage for a given distance. The accuracy for a white target 55 is greater than the accuracy for a gray target 56 over further distances. Also, as indicated above for this sensor, an offset distance is required in order to avoid a false indication of distance. Because the accuracy of the white target and the gray target track one another over the 10 to 30 centimeter range the system was optimized as indicated above, thereby allowing the target surface to decay from a white target to a gray target caused by environmental conditions without suffering a loss of accuracy.

Like the system mentioned above in FIG. 6, the first embodiment of the non-contact seat position system 20 includes a power source 34 for powering the IR sensor 50 and the system 20, and a conditioning module 36 for receiving the sensor signal 30. The conditioning module 36 may output a seat displacement distance signal 58 representative of the sensor signal 30 received. The system 20 also includes a computer 38 for receiving the seat displacement distance DD.

The conditioning module 36 applies a distance characteristic function 60 to the received sensor signal 30 to obtain the seat displacement distance DD.

Turning now to the second embodiment of the invention, FIG. 7 shows an illustrative view of the non-contact seat position system 20 being used to advantage. The sensor 28 of the non-contact seat position system 20 is an optical sensor 70. The optical sensor 70, which may output a sensor signal 30, receives the reflected signal 32. The sensor signal 30 in this embodiment is a track optical displacement signal 72, whereby a seat travel displacement TD may be determined from the track optical displacement signal 72.

Figure 8:
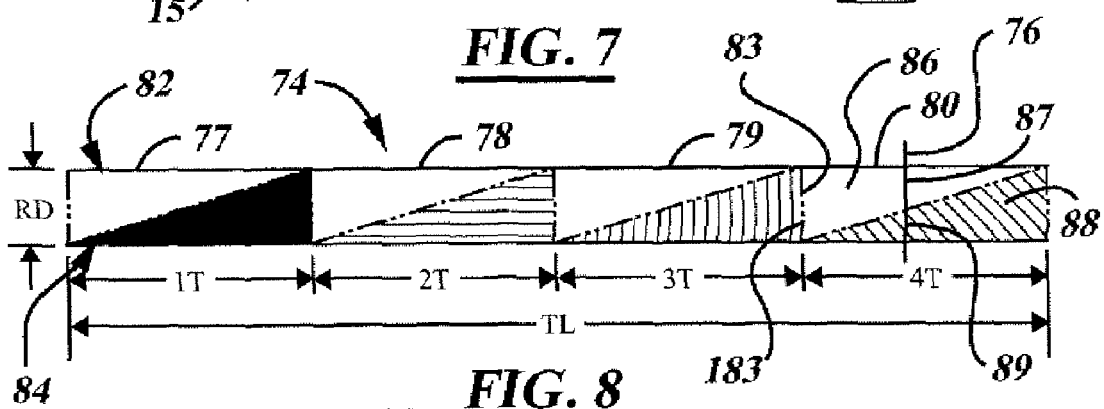
FIG. 8 is a plan view of a strip used to advantage in the second embodiment shown in FIG. 7.

The system 20 includes a target 26, which in this second embodiment is a strip 74. The strip 74 is connected to the upper seat track 24 extending before or starting at the first seat stop 15 through the fixed travel distance FT up to or beyond the second seat stop 16. Positioning of the strip is a matter of convenience on the track, but assurance that the strip covers the fixed travel distance FT is required to avoid an incorrect signal by the optical sensor 70. The upper seat track 24 may reversibly travel a seat travel displacement TD, wherein the track optical displacement signal 72 is taken along an optical sensor view line 76 substantially vertical to said strip 74. Optionally, an optical sensor may be employed having correction circuitry or a correction algorithm, thereby mitigating alignment issues associated with the placement of the strip upon the track. The strip 74 and the optical sensor view line 76 are shown in FIG. 8. The optical sensor view line 76 determining the seat travel displacement TD may be referenced from either of the seat stops 15, 16; in this embodiment it is referenced from first seat stop 15.

The optical sensor 70 of the second embodiment is a Micron model MT9V011 digital image sensor. Alternatively, any optical sensor capable of meeting the signal criterion set herein may be used to advantage.

FIG. 8 shows a plan view of a strip 74 used to advantage in the second embodiment shown in FIG. 7. The strip 74 is four rectangles 77, 78, 79, 80 bounded between a reference line 82 and a base line 84, the reference line 82 being substantially parallel to the base line 84. A reference distance RD separates the reference line 82 and the base line 84. Each of the rectangles 77, 78, 79, 80 forms a segment S77, S78, S79, S80, wherein each segment is connected to another segment along common non-bounded sides of the rectangles. For example, rectangle 79 is connected to rectangle 80 at their common non-bounded sides 83, 183. Each segment has a segment length 1T, 2T, 3T, 4T, respectively, between said non-bounded sides. The sum of segment lengths 1T, 2T, 3T, 4T equals a total length TL. The total length TL of the strip 74 corresponds to the length of the base line 84.

Rectangle 80 is diagonally partitioned forming a first zone 86 and a second zone 88. The optical sensor view line 76 forms a first part 87 in the first zone 86 and a second part 89 in the second zone 88. The first part 87 is bounded between the reference line 82 and the second part 89. The second part 89 is bounded between the first part 87 and the base line 84. The ratio of the first part 87 to the second part 89 increasingly or decreasingly changes along said segment length 4T. The seat travel displacement TD may be determined from the track optical displacement signal 72 by using the second zone 88 and by using the ratio of the first part 87 to the second part 89 adjusted by the segment length 4T.

In the second embodiment the segment lengths 1T, 2T, 3T, 4T are equal and the total length TL is 22 centimeters. Optionally, any number of segments may be used and each segment may vary in length. The seat travel displacement TD is determined by using the sensor information together with a lookup table or other storage parameters that may be saved in the computer for the specific strip. Having a reference distance RD that is constant enables the ratios for a particular segment to be compared to that segment's parameter table for determination of seat displacement.

In the second embodiment of the invention, the first zone 86 for rectangle 80 is white, and the second zone 88 for rectangle 80 is green. Each of the second zones for the other rectangles has their own color. Optionally, each zone of each rectangle may have a different color, pattern, hue, shade, tint, tone, or determinative indication different from each of the other rectangles that form the strip. It should be recognized that the order or scheme of the zones for each rectangle is taken only out of convenience, and that determination of seat displacement may involve other strip styles.

Figure 9:
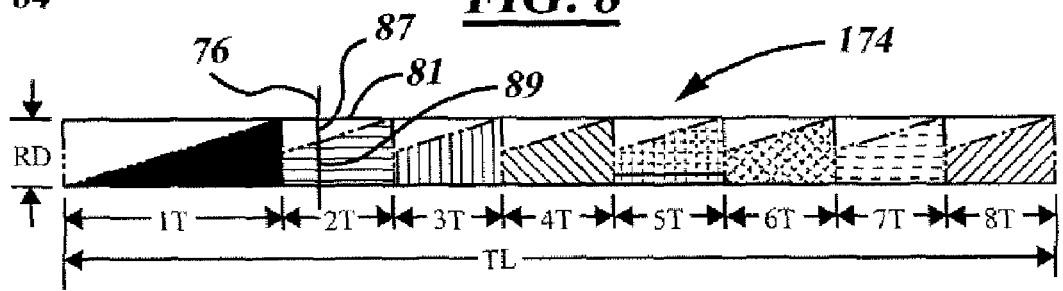
FIG. 9 is a plan view of another strip usable to advantage in the present invention.

FIG. 9 shows a plan view of another strip 174 usable to advantage in the present invention. The strip 174 has eight segments. The optical sensor view line 76 over rectangle 81 forms a first part 87 and a second part 89, and the ratio of said first part to said second part increasingly or decreasingly changes along the segment length 2T. The advantage to the strip of this embodiment is that a null or void signal is avoided in the optical sensor at the beginning of each segment and immediately after the prior segment. Optionally, the optical sensor may have a horizontal scan line allowing for segment determination by sensing across the segments. The slantwise partition for rectangle 81 is linear and the ratio of the first part 87 to the second part 89 is fifty percent at the beginning of the segment length increasing to one hundred percent at the end of a segment length. The ratio may be compared to a known reference source for that segment length in order to determine seat position.

Optionally, each segment length may vary for each of the rectangles. Each rectangle may be slantwise partitioned. The slantwise partition need not be linear.

Returning to the second embodiment of FIG. 7 and like the system mentioned above in FIG. 6, the second embodiment of the non-contact seat position system 20 includes a power source 34 for powering the optical sensor 70 and the system 20, and a conditioning module 36 for receiving the sensor signal 30. The conditioning module 36 may output a seat travel displacement signal 92 representative of the sensor signal 30 received. The system 20 also includes a computer 38 for receiving the seat travel displacement TD.

The conditioning module 36 applies an optical characteristic function 94 to the received sensor signal 30 to obtain the seat travel displacement TD. Alternatively, the optical characteristic function 94 may be a lookup table using the received sensor signal to obtain the seat travel displacement TD.

In another embodiment of the invention the total displacement of a seat track is determined by a strip generated by a series of overlapping or non-overlapping triangles, each triangle having a length in the horizontal direction of different colors upon a tape. At the vertical apex of the triangles, there is a black reference line. Using an optical sensor, the aspect ratio between the white section, the background color section, and the color section of the triangle is used to determine the horizontal position.

Recognizing that seat tracks or any linear device is not perfectly parallel with respect to a sensor, compensation means needs to be provided so that change in focal distance can be accurately accounted for. The vertical apex of the colored triangles referenced to a horizontal line eliminates this variation. The fixed distance between that horizontal line and the black reference line (which is the bottom side of all the triangles) is known. By taking a ratio of the color section of the triangle to the white section over the area of the tape, the ratio multiplied by the fixed reference distance provides a horizontal displacement, thereby negating any effect caused by reason of focal distance variation between the sensor and the tape attached to the track.

A method of non-contact seat position system 20 determination includes: providing a target connected to one of a lower seat track and an upper seat track, the upper seat track is positionably connected to the lower seat track; providing a non-contact sensor coupled to the other of the lower seat track and the upper seat track; powering the system; receiving in the sensor a reflected signal from the target; transmitting a sensor signal from the sensor; receiving in a conditioning module or a computer the sensor signal; and characterizing the sensor signal thereby obtaining a seat travel position representative of the position of the upper seat track 24 to the lower seat track 22.

Optionally, the method may include a calibration routine wherein the value of the sensor signal is stored in a calibration or lookup table when the upper seat track is first positioned in the aft position and another value of the sensor signal is stored in a calibration or lookup table when the upper seat track is positioned next in the fore position.

While particular embodiments of the invention have been shown and described, numerous variations and alternative embodiments will occur to those skilled in the art. Accordingly, it is intended that the invention be limited only in terms of the appended claims.

What is claimed is:

1. A non-contact seat position system comprising:
a lower seat track;
an upper seat track positionably coupled to said lower seat track;
a target coupled to one of said lower seat track and said upper seat track;
an IR sensor coupled to the other of said lower seat track and said upper seat track, in line of sight of said target, wherein said IR sensor when powered outputs a sensor signal determined from a reflected signal from said target; and
wherein said reflected signal received by said IR sensor is a sensor displacement distance signal, whereby a seat displacement distance may be determined from said sensor displacement distance signal.

2. The non-contact seat position system in claim 1 further comprising a power source for powering said IR sensor and the system.

3. The non-contact seat position system in claim 2 further comprising a conditioning module for receiving said sensor signal, said conditioning module outputting a seat travel distance representative of said sensor signal received.

4. The non-contact seat position system in claim 2 further comprising a computer for receiving said sensor signal, said computer computing a seat travel distance representative of said sensor signal received.

5. The non-contact seat position system in claim 3 further comprising a computer for receiving said seat travel distance.

6. The non-contact seat position system in claim 1 wherein one of said lower seat track and said upper seat track has a first seat stop and a second seat stop, wherein said upper seat track may reversibly travel a seat travel distance.

7. The non-contact seat position system in claim 6 wherein said IR sensor is coupled to said other of said lower seat track and said upper seat track at an offset target distance beyond one of said seat stops.

8. The non-contact seat position system in claim 7 wherein said offset target distance is nearly 10 centimeters, said seat travel distance ranges between zero and 22 centimeters, and said seat displacement distance ranges between nearly 10 centimeters and 32 centimeters.

9. The non-contact seat position system in claim 1 wherein said target has a target surface.

10. The non-contact seat position system in claim 9 wherein said target surface is a white target.

11. The non-contact seat position system in claim 1 further comprising a power source for powering said IR sensor and the system, a conditioning module for receiving said sensor signal, said conditioning module outputting a seat displacement distance signal representative of said sensor signal received, and a computer for receiving said seat displacement distance.

12. The non-contact seat position system in claim 11 wherein said conditioning module applies a distance characteristic function to the received sensor signal to obtain said seat displacement distance.

13. The non-contact seat position system in claim 1 further comprising a power source for powering said IR sensor and the system, and a computer for receiving said sensor signal, wherein said computer applies a distance characteristic function to the received sensor signal to obtain a seat displacement distance.

14. A non-contact seat position system comprising:
a lower seat track;
an upper seat track positionably coupled to said lower seat track;
a target coupled to one of said lower seat track and said upper seat track; and
a sensor coupled to the other of said lower seat track and said upper seat track, in line of sight of said target, wherein said sensor when powered outputs a sensor signal determined from a reflected signal from said target;
wherein said sensor is an optical sensor;
wherein said reflected signal received by said optical sensor is a track optical displacement signal, whereby a seat travel displacement may be determined from said track optical displacement signal;
wherein said target is a strip, and one of said lower seat track and said upper seat track has a first seat stop and a second seat stop, wherein said upper seat track may reversibly travel a seat travel distance, wherein said track optical displacement signal is taken along an optical sensor view line substantially vertical to said strip; and wherein said strip is a plurality of rectangles bounded between a reference line and a base line, said reference line being substantially parallel to said base line and separated by a reference distance, each of the plurality of rectangles forms a segment, each segment coupled to another segment along common non-bounded sides of each rectangle, each segment having a segment length between said non-bounded sides, wherein the sum of segment lengths equals a total length of said strip along said base line.

15. The non-contact seat position system in claim 14 wherein said segment length may vary for each of said plurality of rectangles, and at least one rectangle being slantwise partitioned forming a first zone and a second zone, wherein said optical sensor view line forms a first part in said first zone and a second part in said second zone, and the ratio of said first part to said second part increasingly or decreasingly changes along said segment length.

16. The non-contact seat position system in claim 15 wherein the slantwise partition is linear and the ratio of said first part to said second part is fifty percent at the beginning of a segment length increasing to one hundred percent at the end of a segment length for said rectangle.

17. The non-contact seat position system in claim 14 wherein at least one rectangle being diagonally partitioned forming a first zone and a second zone, wherein said optical sensor view line forms a first part in said first zone and a second part in said second zone, and the ratio of said first part to said second part increasingly or decreasingly changes along said segment length, whereby a seat travel displacement may be determined from said track optical displacement signal using said second zone and using the ratio of said first part to said second part adjusted by said segment length.

18. The non-contact seat position system in claim 17 wherein said first zone for each rectangle is white, and said second zone for each rectangle has a color, pattern, hue, shade, tint, tone, or determinative indication different from each of the other rectangles that form said strip.

19. The non-contact seat position system in claim 17 further comprising a power source for powering said optical sensor and the system, a conditioning module for receiving said sensor signal, said conditioning module outputting a seat travel displacement signal representative of said sensor signal received, and a computer for receiving said seat travel displacement.

20. The non-contact seat position system in claim 19 wherein said conditioning module applies an optical characteristic function to received said sensor signal to obtain said seat travel displacement.

21. The non-contact seat position system in claim 20 wherein said optical characteristic function is a lookup table using received said sensor signal to obtain said seat travel displacement.

22. The non-contact seat position system in claim 17 further comprising a power source for powering said optical sensor and the system, and a computer for receiving said sensor signal, wherein said computer applies an optical characteristic function to received said sensor signal to obtain a seat travel displacement.

23. A non-contact seat position system for a vehicle comprising:
a vehicle;
a lower seat track coupled to said vehicle;
a upper seat track positionably coupled to said lower seat track;
a target coupled to one of said lower seat track and said upper seat track;

an optical sensor coupled to the other of said lower seat track and said upper seat track, in line of sight of said target, wherein said optical sensor when powered outputs a sensor signal determined from a reflected signal from said target;
a power source for powering said optical sensor and the system;
a conditioning module for receiving said sensor signal, said conditioning module outputting a seat travel displacement signal representative of said sensor signal received; and
a computer for receiving said seat travel displacement;
wherein said reflected signal received by said optical sensor is a track optical displacement signal, whereby a seat travel displacement may be determined from said track optical displacement signal;
wherein said target is a strip, and one of said lower seat track and said upper seat track has a first seat stop and a second seat stop, wherein said upper seat track may reversibly travel a seat travel distance, wherein said track optical displacement signal is taken along an optical sensor view line substantially vertical to said strip;
wherein said strip is a plurality of rectangles bounded between a reference line and a base line, said reference line being substantially parallel to said base line and separated by a reference distance, each of the plurality of rectangles forms a segment, each segment coupled to another segment along common non-bounded sides of each rectangle, each segment having a segment length between said non-bounded sides, wherein the sum of segment lengths equals a total length of said strip along said base line;
wherein each of the plurality of rectangle being diagonally partitioned forming a first zone and a second zone, wherein said optical sensor view line forms a first pan in said first zone and a second pan in said second zone, and the ratio of said first part to said second part increasingly or decreasingly changes along said segment length, whereby a seat travel displacement may be determined from said track optical displacement signal using said second zone and using the ratio of said first part to said second part multiplied by said segment length;
wherein said first zone for each rectangle is white, and said second zone for each rectangle has a color, pattern, hue, shade, tint, tone, or determinative indication different from each of the other rectangles that form said strip,
wherein said conditioning module applies an optical characteristic function to received said sensor signal to obtain said seat travel displacement.

24. A non-contact seat position system comprising;
a lower seat track;
an upper seat track positionably coupled to said lower seat track;
a target coupled to one of said lower seat track and said upper seat track;
an IR sensor coupled to the other of said lower seat track and said upper seat track, in line of sight of said target, wherein said IR sensor when powered outputs a sensor signal determined from a reflected signal from said target;
a power source for powering said IR sensor and the system;
a conditioning module for receiving said sensor signal, said conditioning module outputting a seat displacement distance signal representative of said sensor signal received; and
a computer for receiving said seat displacement distance.

25. The non-contact seat position system in claim 24 wherein one of said lower seat track and said upper seat track has a first seat stop and a second seat stop, wherein said upper seat track may reversibly travel a seat travel distance.

26. The non-contact seat position system in claim 25 wherein said IR sensor is coupled to said other of said lower seat track and said upper seat track at an offset target distance beyond one of said seat stops.

27. The non-contact seat position system in claim 26 wherein said offset target distance is nearly 10 centimeters, said seat travel distance ranges between zero and 22 centimeters, and aid seat displacement distance ranges between nearly 10 centimeters and 32 centimeters.

28. The non-contact seat position system in claim 24 wherein said target has a target surface is a white target.

29. The non-contact seat position system in claim 28 wherein said target surface is a white target.

30. The non-constant seat position system in claim 24 wherein said conditioning module applies a distance characteristic function to the received sensor signal to obtain said seat displacement distance.

* * * * *